United States Patent [19]
Wanzl

[11] Patent Number: 5,836,596
[45] Date of Patent: Nov. 17, 1998

[54] SHOPPING CART

[75] Inventor: Rudolf Wanzl, Leipheim, Germany

[73] Assignee: Wanzl GmbH & Co., Leipheim, Germany

[21] Appl. No.: 290,876
[22] PCT Filed: Mar. 24, 1994
[86] PCT No.: PCT/DE94/00337
 § 371 Date: Oct. 11, 1994
 § 102(e) Date: Oct. 11, 1994
[87] PCT Pub. No.: WO94/22705
 PCT Pub. Date: Oct. 13, 1994

[30] Foreign Application Priority Data

Apr. 7, 1993 [DE] Germany .......................... 93 05 333.9
Jul. 9, 1993 [DE] Germany .......................... 93 10 234.8
Dec. 22, 1993 [DE] Germany .......................... 93 19 720.9

[51] Int. Cl.⁶ ..................................... B62B 11/00
[52] U.S. Cl. ................. 280/33.991; 280/33.992
[58] Field of Search .................. 280/33.991, 33.992, 280/33.995, 33.997, 33.998, 47.19, 47.34, 47.35; 40/590, 591, 643, 649

[56] References Cited

U.S. PATENT DOCUMENTS

| 3,157,871 | 11/1964 | Umanoff | 280/33.992 |
| 3,361,438 | 1/1968 | Davis | 280/33.991 |
| 3,702,018 | 11/1972 | Wood | 280/33.992 |
| 3,706,460 | 12/1972 | Thomas | 280/33.995 |
| 4,273,346 | 6/1981 | Rehrig | 280/33.995 |
| 4,376,502 | 3/1983 | Cohen | 280/33.992 |
| 4,702,402 | 10/1987 | Ferri | 280/33.992 |
| 4,922,639 | 5/1990 | Rehrig | 280/33.991 |
| 5,111,604 | 5/1992 | Rehrig | 280/33.991 |
| 5,210,968 | 5/1993 | Rehrig | 280/33.991 |
| 5,306,033 | 4/1994 | Evans | 280/33.992 |

FOREIGN PATENT DOCUMENTS

| 1511093 | 1/1968 | France . | |
| 22 64 856 A1 | 4/1975 | Germany | 280/33.992 |
| 8526713 | 8/1986 | Germany . | |
| 91/19962 | 12/1991 | WIPO | 280/33.991 |

Primary Examiner—Richard M. Camby
Assistant Examiner—Frank Vanaman
Attorney, Agent, or Firm—William A. Knoeller

[57] ABSTRACT

The invention relates to a shopping cart (1) with a chassis (2), a device (4) to push it, and a basket-like container (5) to accommodate goods carried by the chassis (2), the chassis (2) and the basket-like container (5) being designed in such a way that shopping carts (1) of the same kind can be pushed into one another in order to save space and the container (5) being composed of a carrying section (7) which is attached to the chassis (2) and which has a bottom (9), two side walls (8), and a back wall (21) and of an end piece (23) which is connected to and carried by the carrying section (7) and which is located facing the back wall (21). The essence of the invention consists of the end piece (23) being designed as a structural element made of plastic composed of one or more pieces and rigidly connected to the carrying section (7).

14 Claims, 4 Drawing Sheets

FIG. 6
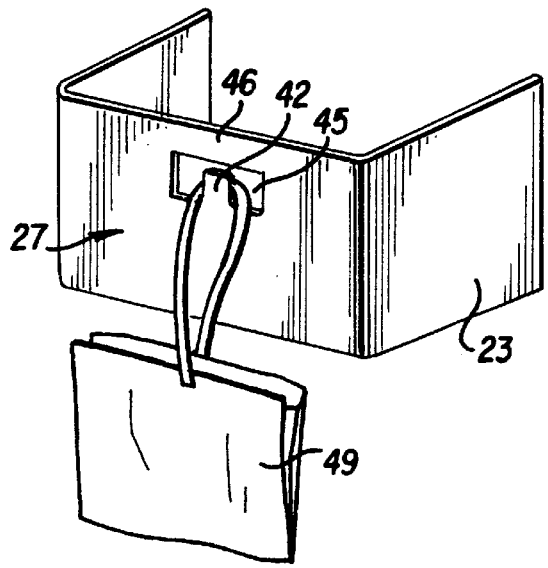
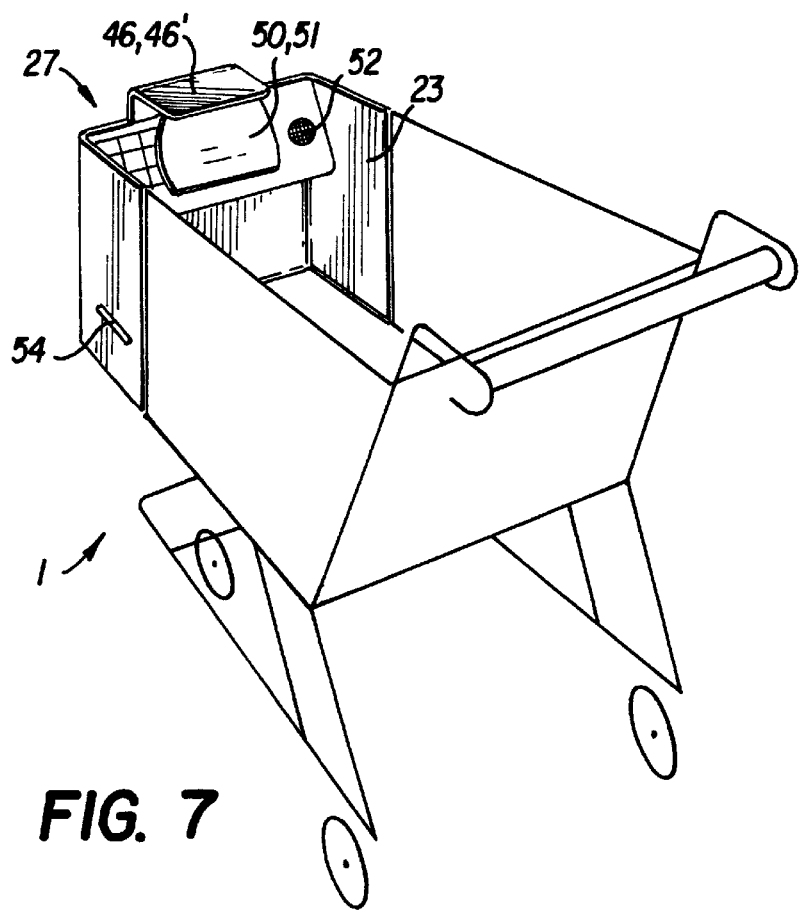
FIG. 7

FIG. 8
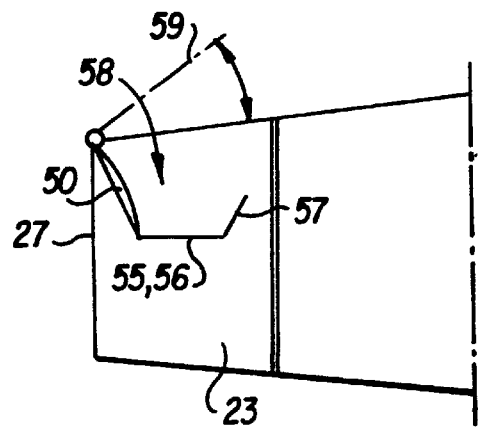
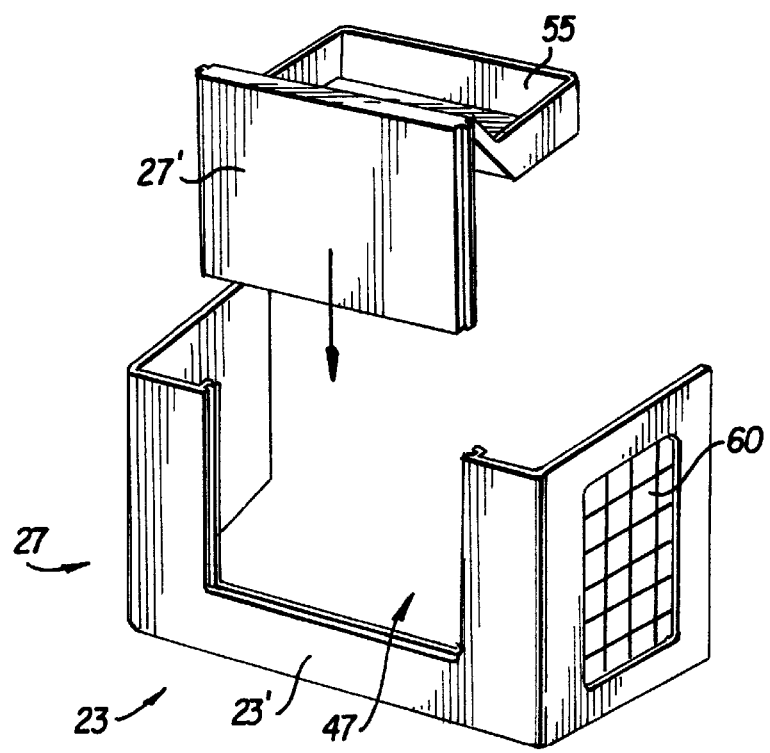
FIG. 9

SHOPPING CART

BACKGROUND OF THE INVENTION

The invention relates to a shopping cart with a chassis, a device to push it, and a basket-like container to accommodate goods carried by the chassis, the chassis and the basket-like container being designed in such a way that shopping carts of the same kind can be pushed into one another in order to save space and the container being composed of a carrying section which is attached to the chassis and which has a bottom, two side walls, and a back wall and of an end piece or front extension which is connected to and carried by the carrying section and which is located facing the back wall.

A shopping cart of this type is described in French patent specification 1 511 093. In an case of that shopping cart, the end piece is attached to the carrying section so that it can pivot about a horizontal axis in the plane of the bottom from a non-use position, in which the outline of the end piece covers part of the outline of the carrying section, into an in-use position in which the end piece contributes to an increase in the volume of the basket-like container. The said shopping cart is relatively easy to build and no longer meets the requirements demanded today of a modern shopping cart. For example, it can now be expected that the basket of a shopping cart be equipped with a hook for a bag or at least with an advertising surface or with a surface to identify the cart. Other desirable features include bumpers on the basket, which are suitable to absorb harmlessly any shocks incurred during use of the shopping cart. Another feature which is often demanded is that the baskets of the shopping carts be equipped with a partition or with a tray for small articles. Finally, it has recently been proposed that shopping carts be equipped with new electronic information systems in order to be able to provide customers with up-to-date sales information while they are shopping. As a rule, all of these devices are manufactured as individual parts and offered as accessories, which means that they have to be added to the shopping cart in all cases. This method of equipping shopping carts with accessories is expensive.

SUMMARY OF THE INVENTION

The purpose of the invention is to make it possible for the number of accessory parts installed individually on the basket-like container to be produced with shopping carts of the generic type.

In accordance with the invention, this consists of the end piece or front extension being manufactured of plastic, being designed as one piece or a component of several pieces, and being rigidly connected to the carrying section.

The special advantage of the invention is that the end piece is made of plastic. Consequently, it is possible to include a great number of useful devices during injection molding of the plastic part. For example, indentations or guides can be molded into which a page-shaped advertising medium or an identification sign can be inserted. It is also possible to provide a receptacle for a bag hook to be installed on the front side. It is even possible to mold an indentation as a tray for small articles or to provide an opening in order to produce a grip to pull the shopping cart. As well, vertical guides can be molded on the inner walls of the end piece as receptacles for a partition to be installed in the front section of the basket-like container. In addition, the end piece can be provided with deflectors or zones which help to reduce damage to store fixtures. Finally, it is possible, in a very functional manner, to insert in or to mold on the end piece an electronic information system, for example a screen with loud speaker or other electronic structural elements which allow the shopping process or shopping carts to be monitored.

Preferably, the end piece is designed as one piece or front extension. However it is also possible, in a functional manner, to produce the end piece from at least two parts, also made of plastic, these parts being combined into one structural component. For example, such a solution is recommended if the front side of the end piece is to be of such varied design that the most diverse requirements can be met. For example, it is definitely possible to provide the front side of the end piece with a large cutout in which, as an alternative, parts with varied designs can be inserted and secured against unauthorized removal. These parts can be equipped with the said electronic information system or with the small article tray and/or with other suitable useful devices. Shopping carts whose end pieces have different devices which promote, support, or influence the shopping process can then be produced in an advantageous manner in a modular-like system.

BRIEF DESCRIPTION OF THE DRAWINGS

The invention is explained in more detail using several embodiments. The illustrations show as follows:

FIG. 6 shows a further way in which a bag hook can be provided;

FIG. 7 illustration a shopping cart with an electronic information system;

FIG. 8 shows an end piece with a small article tray and

FIG. 9 shows an end piece consisting of two parts.

DETAILED DESCRIPTION OF PREFERRED EMBODIMENT

Figure 1:
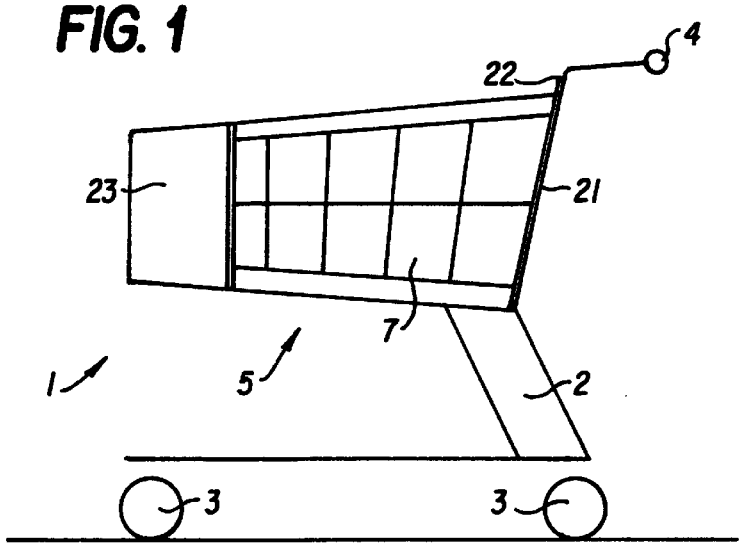
FIG. 1 illustration a generic shopping cart.

The shopping cart 1 illustrated in FIG. 1 represents the many types of shopping carts 1 covered by the invention. All of these shopping carts have a chassis 2 with four casters, as a rule. The chassis 2 carries a basket-like container 5. A device 4 to push the cart is provided, either on the chassis 2 or on the basket-like container 5. Both the chassis 2 as well as the basket-like container 5 are designed to taper in the known manner in the direction of travel of the cart so that several shopping carts 1 of the same kind can be nested that is pushed into one another in order to save space. The basket-like container 5 consists of a carrying section 7 which is attached to the chassis 2 in a manner which is known and, therefore, not described in more detail. An end piece 23 is attached rigidly to the carrying section 7 in such a way that it forms the front end of the basket-like container 5. While the carrying section 7 is usually designed as a wire mesh structure which definitely can have individual plastic parts or even be made completely of plastic, the end piece is manufactured completely of plastic.

Figure 2:
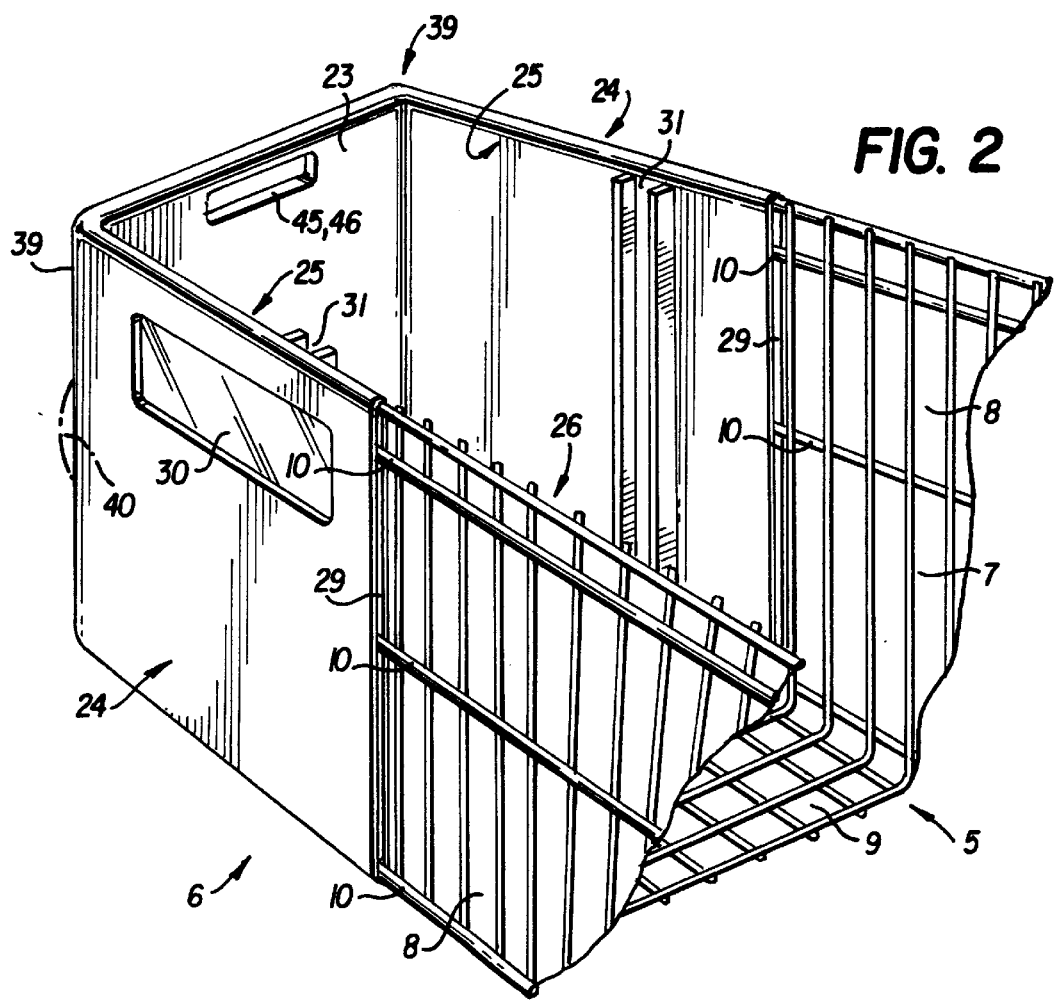
FIG. 2 shows the front section of the basket-like container.

FIG. 2 shows the front area 6 of the basket-like container 5, only part of which is illustrated. The carrying section 7, to which the end piece or front extension 23 is attached, can be seen. The carrying section 7 has two side walls 8 and a bottom 9. The side walls 8 end in the vicinity of the device 4 to push the cart which is attached to the basket-like container 5 in the illustration by a back wall 21 in the form of a flap (see FIG. 1) perpendicular to the direction of travel of the shopping cart 1 which is pivoted in a known manner about a horizontal axis 22 located at the top in such a way that it can be swung upwards into the interior of the basket-like container 5. This allows several shopping carts 1 of the same kind to be pushed into one another if the basket-like containers 5 of the shopping carts 1 taper forward in the direction of travel of the shopping cart. As illustrated in more detail in FIG. 3, projections 18 are provided on the carrying section 7, in particular on its side walls 8, which engage in the indentations 29 on the end piece 23 and allow the end piece 23 to be attached rigidly to the carrying section 7. A device in the form of at least one indentation 30 in which advertising media can be affixed or an identification sign inserted can be provided on the side walls 24 of the end piece or front extension 23 which also tapers in the direction of travel of the shopping cart. A vertical groove 31 can be provided on each of the inner sides 25 of the side walls 24 of the end piece 23 as receptacles of a known partition, which is not illustrated in more detail, which fits into the grooves 31, it being recommended that the grooves 31 be terminated at the bottom in such a way that the bottom edge of a partition fitted into the grooves 31 does not lie on the bottom 26 of the end piece 23. This has the advantage that liquid leaking out of an article being transported is not held back by the partition. This measure is also useful when the basket-like containers 5 are being cleaned. In addition to the device just mentioned, it is also possible to provide prominences 40 on the front edges 39 of the end piece 23 which function as bumpers. A further device in the form of an opening 45 can be provided in the front wall 27 of the end piece 23 in order to produce a grip section 46 for pulling the shopping cart 1.

Figure 3:
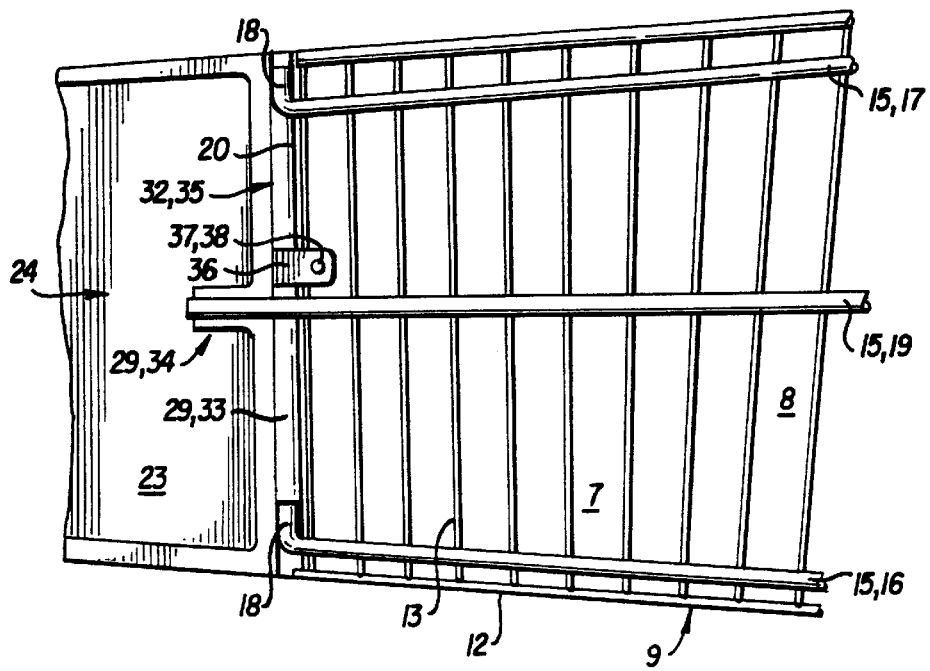
FIG. 3 shows a cross-section of one way in which the end piece or front extension can be attached to the carrying section.

FIG. 3 shows, in a side view and partial cross-section, how the end piece 23 can be appropriately connected rigidly with the carrying section 7. As already mentioned, the carrying section 7 is preferably designed as a mesh structure, such as is known, for example, from the usual wire baskets on shopping carts 1. The carrying section 7 is made from longitudinal and cross wires 12, 13 and is U-shaped, i.e. with a bottom 9, to each side of which a side wall 8 is connected. The cross wires 13, which as a rule are thinner, cross in the area of the side walls 8 with longitudinal wires 15, which are preferably thicker and in the area of the bottom 9 with longitudinal wires 12, which are preferably of the same thickness as cross wire. Both a bottom 16 as well as an upper longitudinal wire 17 project forwardly beyond the carrying section 7 on each side wall 8, are bent upwards, and the hooks 18 produced in this manner are snapped into the indentation 29 in the form of a groove 33 on each free edge 32 of the end piece or front extension 23 and on its side walls 24 forming a rigid connection. A middle longitudinal wire 19 also projects from each side wall 8 of the carrying section 7 beyond the front end of the carrying section 7 into an indentation 29 in the form of a horizontal opening 34 on each side wall 8. The longitudinal wires 19 interlock into the openings 34 so that the end piece 23 cannot be moved up and down along the hooks 18. In order to prevent the end piece being pulled forward away from the carrying section 7, it is recommended that two projecting clips 36 be molded on both free vertical edges 35 of the end piece 23, each of the pair of clips 36 having a mutual opening 37 through which a pin 38 can be inserted, making a rigid connection. Each pin 38 is located on the front cross wire 20 of the carrying section 7 in such a way that the cross wires 20 are closer to the two grooves 33 than the pins 38. The pins 38 grip behind the cross wires 20, i.e. a part of the carrying section 7, so that the end piece 23 cannot be pulled forward away from the carrying section 7. The result is that the end piece or front extension 23 is rigidly locked or attached to the carrying section 7.

In place of the longitudinal wires 16 and 17 which are bent at an angle, a further method, which is not illustrated, of attaching the end piece 23 rigidly to the carrying section 7 is to provide longitudinal wires on the side walls and on the bottom 9 which project slightly beyond the front open end of the carrying section 7, but which are then bent back 180° again towards the side walls and the bottom 9 and are welded to the cross wires 13. The resulting eyes fit into the openings or indentations 29 on the side walls 24 and on the bottom 26 of the end piece 23. Each indentation 29 has a resilient tongue. Each tongue is to be inserted in an eye. In installing the end piece 23 on the carrying section 7, the end piece 23 is pressed against the carrying section 7 so that it fits precisely. The tongues are moved to the side by the eyes into which they then snap. This practical method of attachment does not require any additional means of attachment 38.

Whereas up to now preferably the design as well as the way in which the end piece 23 is arranged on and attached to the shopping cart 1 were described, the following embodiments show further devices which are functional and part of the invention and which can be provided on the end piece or front extension 23. These devices, just like the ones already mentioned, promote, support, or influence the shopping process.

Figure 4:
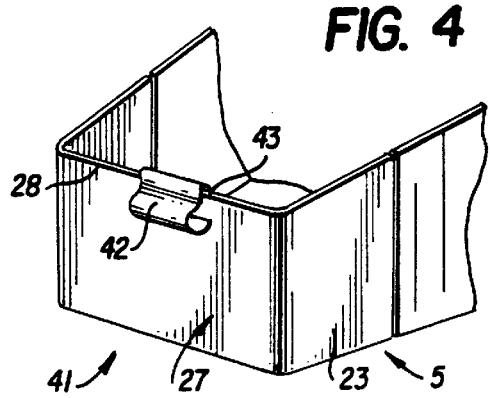
FIG. 4 an end piece with detachable bag hook.

FIG. 4 shows the front section 41 of the end piece 23. A hook-shaped part designed as a so-called bag hook 42 is pivoted around a horizontal axis 43 on or close to the upper edge 28 of the front wall 27. For example, shopping bags can be hung on this device on the basket-like container 5.

Figure 5:
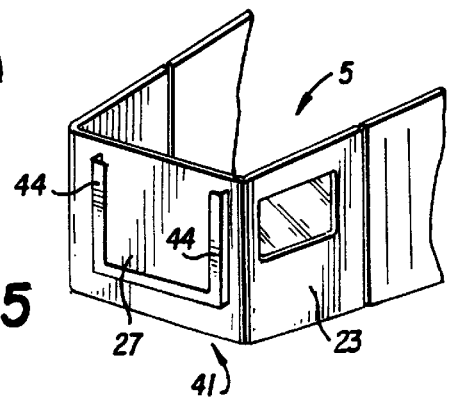
FIG. 5 shows the front section of the end piece with indentations as receptacles for a page-shaped advertising medium.

FIG. 5 also shows the front section 41 of the end piece 23. To hold a page-shaped advertising medium, for example a sign made of cardboard, known guides 44, which are not described in more detail, indentations, undercuts or the like can be provided on the outer side, alternatively also on the inner side of the front wall 27. This devices allows advertising directed at the customer.

In place of a device in the form of a detachable bag hook 42, as illustrated in FIG. 4, a bag hook 42, which is molded on the front wall 27 of the end piece 23, can also be provided in accordance with FIG. 6. For this purpose, an opening 45 is provided in which the bag hook 42 is arranged, allowing a space to develop towards the top so that a bag can be hung in it. This embodiment also contains a grip section 46, as illustrated in FIG. 2. A bag 49 hanging from the bag hook 42 is illustrated in the figure.

FIG. 7 shows a shopping cart 1 on which a device in the form of an information system 50 equipped with a screen 51 is placed on the inner side of the front wall 27 of the end piece 23. A further device in the form of a glare shield 46' can be molded above the screen 51 on the end piece 23 in a functional manner so that information displayed on the screen 51 can be seen better. At the same time the glare shield 46' can be designed as a grip section 46 with which the shopping cart 1 can be pulled. The information system 50 includes the screen 51, preferably a loudspeaker 52, as well as an electricity supply device 53 which, for example, is composed of solar cells, batteries, or other sources of electricity on the shopping cart 1. The information system 50 can be controlled by radio, infrared waves, or electricity in the known manner, in which case the control unit, which is not illustrated, is housed either outside of the shopping cart 1, i.e. externally, or also in the end piece 23. However, regardless of the existence of an information system 50, a further control unit 54 can be inserted or injected into the end piece 23. Such control units 54, also called "transponders" by specialists, are receiving and transmitting units only a few millimeters large which are designed as passive components preferably operating on radio control (RC basis). The position of shopping carts 1 equipped with control units 54 can be determined easily so that it is possible, for example, to follow the path taken by the shopping cart 1 through a store or to find shopping carts 1 left indiscriminately in the vicinity of a self-serve store.

The embodiment illustrated in FIG. 8 shows that a device in the form of a small article of a small article tray 55 can be molded onto the end piece 23 which is connected to the information system 50 and which is designed, starting from the lower edge of the information system 50, as a bottom 56 extending towards the back of the shopping cart 1 and to which a wall 57 directed upwardly is connected. A small article tray 55 of this design preferably extends over the width of the end piece 23. Where there is no information system 50, the small article tray 55 is molded directly onto the inner side of the front wall 27 of the end piece 23. The interior of the small article tray 55, or very generally a space 58, which can also be produced by installing a partition (see FIG. 2) can be closed by a cover 59, which can also be equipped with a locking device. Valuable articles or personal valuables can be locked in it.

FIG. 9 shows an end piece 23 consisting of two parts 23', 27' made of plastic. The front wall 27 of the end piece 23 has a cutout 47 in which a further part can be inserted and locked to fit as precisely as possible so that it cannot be removed from the end piece or front of extension 23 without the assistance of a suitable tool. The part described in the example as insert part 27' can be equipped with the most varied devices, especially with those previously mentioned. Whereas the end piece 23' with the cutout 47 is usually the same in all cases, the insert parts 27' have different designs. Merely those areas of the insert parts 27' which have to fit together with the end piece 23' remain the same. For example, one insert part 27' may only have one bag hook 42; on the other hand, the other insert part 27' may be equipped with a bag hook 42 and a small article tray 55. Another insert part 27' can have the information system 50 mentioned, while a fourth insert part 27' can be equipped with a control unit 54. These figures are supposed to show that the invention makes it possible to design the end piece 23, based on its relevant application, in different variations or combinations, i.e. equipped with different devices. In this case it is definitely conceivable to even design the end piece 23 from more than two parts, all of which can be easily connected through the use of known aids, like grooves, undercuts or snap-in catches and which, alternatively, are secured against unauthorized detachment by means of additional safety aids, like screws, rivets, etc.

It should be mentioned that the end piece or front extension 23 can also be designed without a bottom 26 and side walls 24, at least in simple embodiments. It is important that the end piece 23 closes the front open side of the carrying section 7, which is opposite to the back wall 21. Furthermore, it is to be noted that an end piece 23 of one or more pieces can also have at least one mesh-shaped zone (60) so that a cashier in a self-serve store can check whether the end piece 23 contains goods. Such zones (60) are indicated in the embodiment illustrated in FIG. 9.

What is claimed is:

1. A shopping cart comprising a chassis, a means to push said cart, a container to accommodate goods carried by the chassis, the chassis and the container being designed in such a way that shopping carts of the same kind can be pushed into one another in order to save space;

the container being composed of
(a) a carrying section which is attached to the chassis and which has a bottom, two side walls, an open front end and a back wall and
(b) a front extension which has a bottom, two side walls, a front wall and an open back end;

said front extension being rigidly connected to and carried by the carrying section in a manner to prevent relative motion between the carrying section and the front extension and to form with the carrying section a common space; said front extension being located to face said back wall; said front extension being made of plastic and comprised of at least one device for promoting, supporting or influencing the shopping process.

2. The shopping cart of claim 1 in which the front wall of said front extension has an opening to form a grip section.

3. The shopping cart of claim 1 in which one of the walls of said front extension has a bag hook.

4. The shopping cart of claim 1 in which said device comprises one of the walls of said front extension having at least one indentation for the installation of advertising media or an identification sign.

5. The shopping cart of claim 1 in which said device comprises one of the walls of said front extension having means to hold a page-shaped advertising medium.

6. The shopping cart of claim 1 in which said device is a small article tray molded as part of said front extension.

7. The shopping cart of claim 1 in which said device comprises an information system having a display screen.

8. The shopping cart of claim 26 including a glare shield for said screen connected to said device.

9. The shopping cart of claim 7 in which said information system includes an electricity supply unit housed in said front extension and connected to said information system.

10. The shopping cart of claim 1 in which said device comprises a transponder.

11. The shopping cart of claim 1 in which the walls of said front extension have vertical grooves.

12. The shopping cart of claim 11 including a partition in said vertical grooves, said partition having a small article tray.

13. The shopping cart of claim 11 in which said front extension has an opening in one of said walls with a mesh cover thereover.

14. A shopping cart comprising a chassis, a means to push said cart, a container to accommodate goods carried by the chassis, the chassis and the container being designed in such a way that shopping carts of the same kind can be pushed into one another in order to save space;

the container being composed of
(a) a carrying section which is attached to the chassis and which has a bottom, two side walls, an open front end and a back wall and
(b) a front extension which has a bottom, two side walls, a front wall and an open back end;

said front extension being connected to and carried by the carrying section to form with the carrying section a common space; said front extension being located to face said back wall; said front extension being made of plastic and comprised of at least one device for promoting, supporting or influencing the shopping process; one of the carrying sections and the front extension having protrusions and the other of the carrying section and the front extension having mating indentations which engage said protrusions to produce a snap-in connection therebetween.

* * * * *